Oct. 31, 1961  R. S. GOEBEL ET AL  3,006,077
APPARATUS FOR DEHYDRATION OF REFRIGERATION HERMETIC COMPRESSORS
Filed March 3, 1958  7 Sheets-Sheet 3
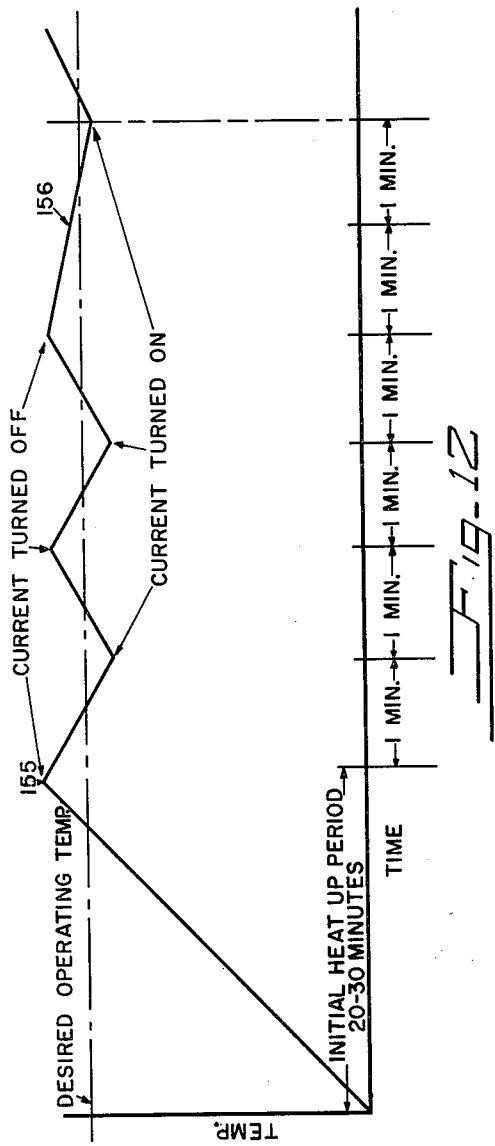
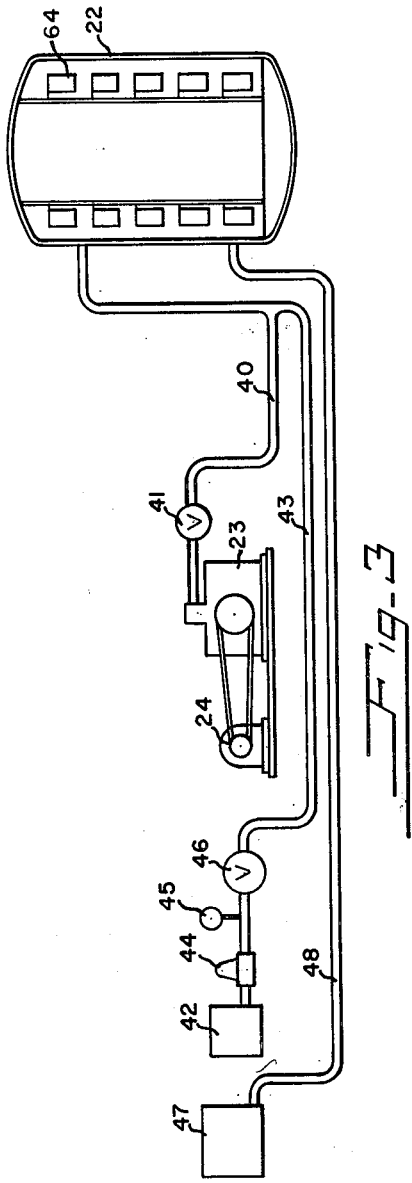
*INVENTORS*
ROBERT S. GOEBEL
CHARLES P. SCHOLZ
BY
DES JARDINS, ROBINSON, TRITLE & SCHENK
THEIR ATTORNEYS

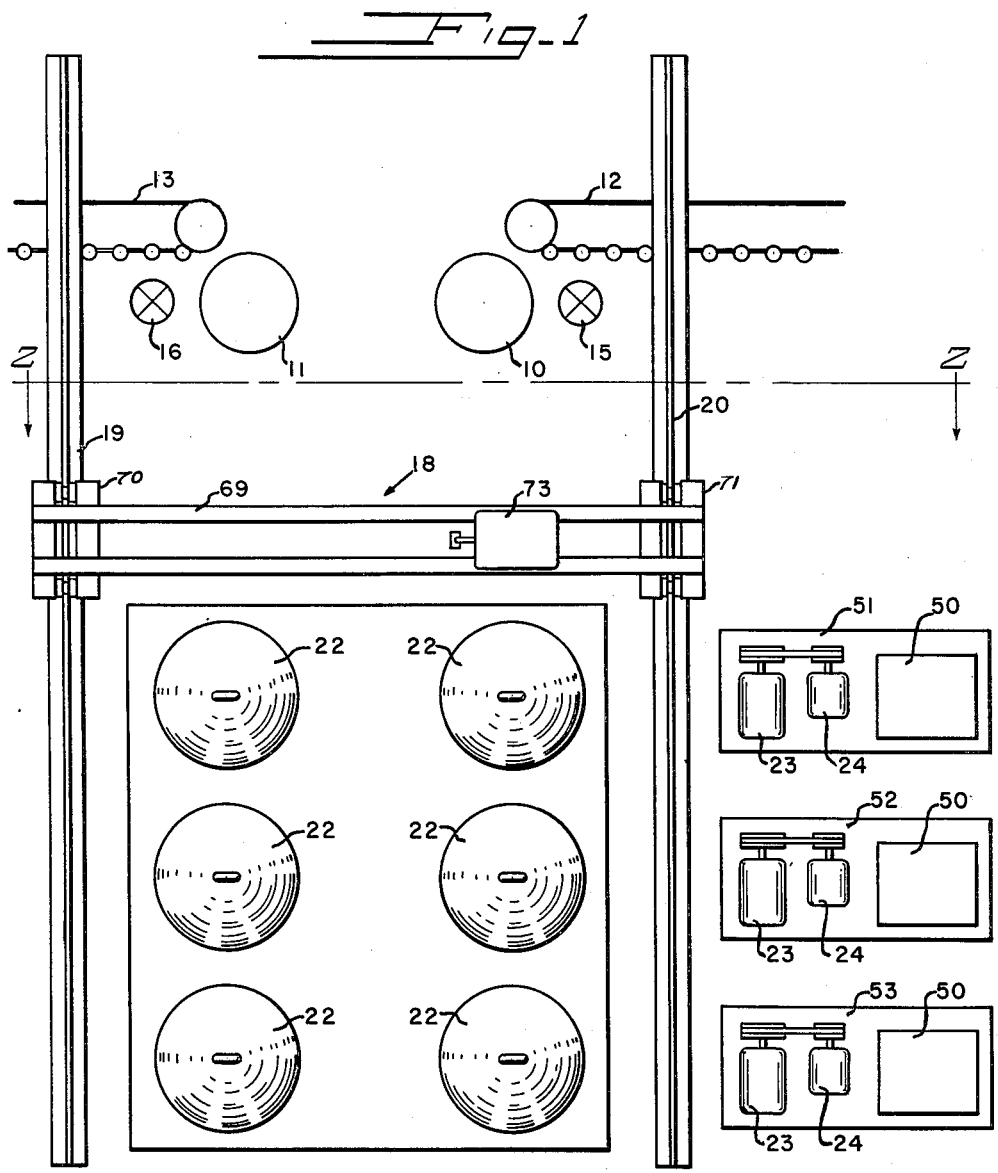

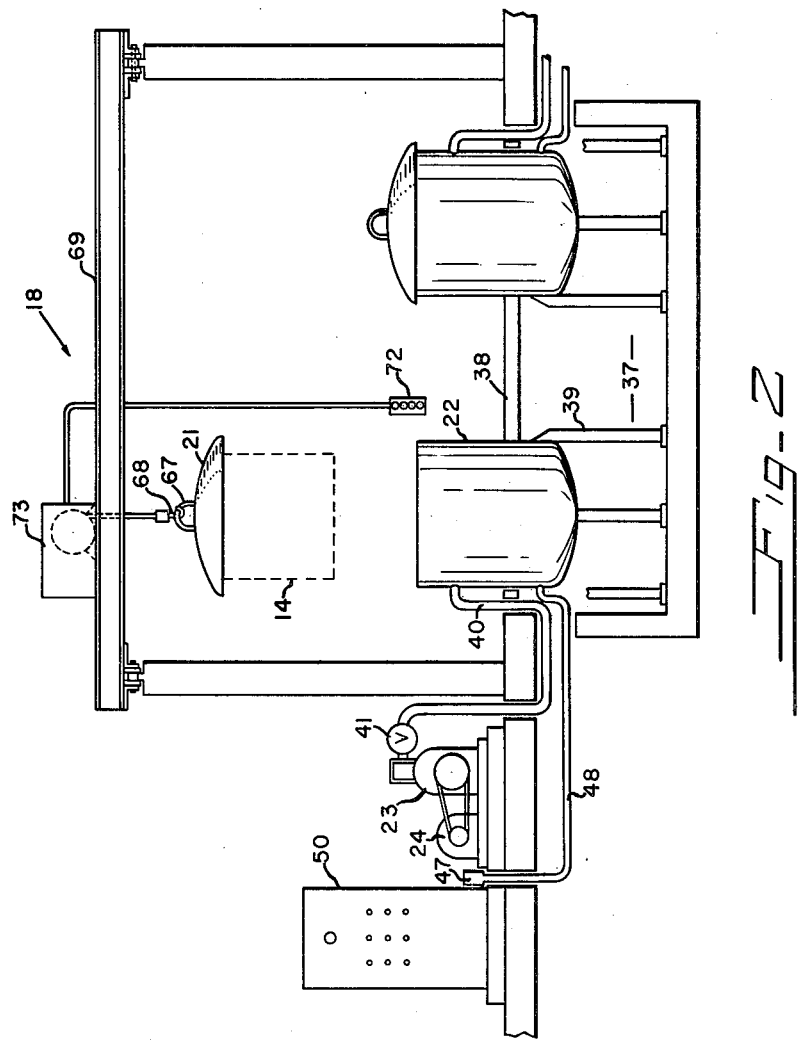

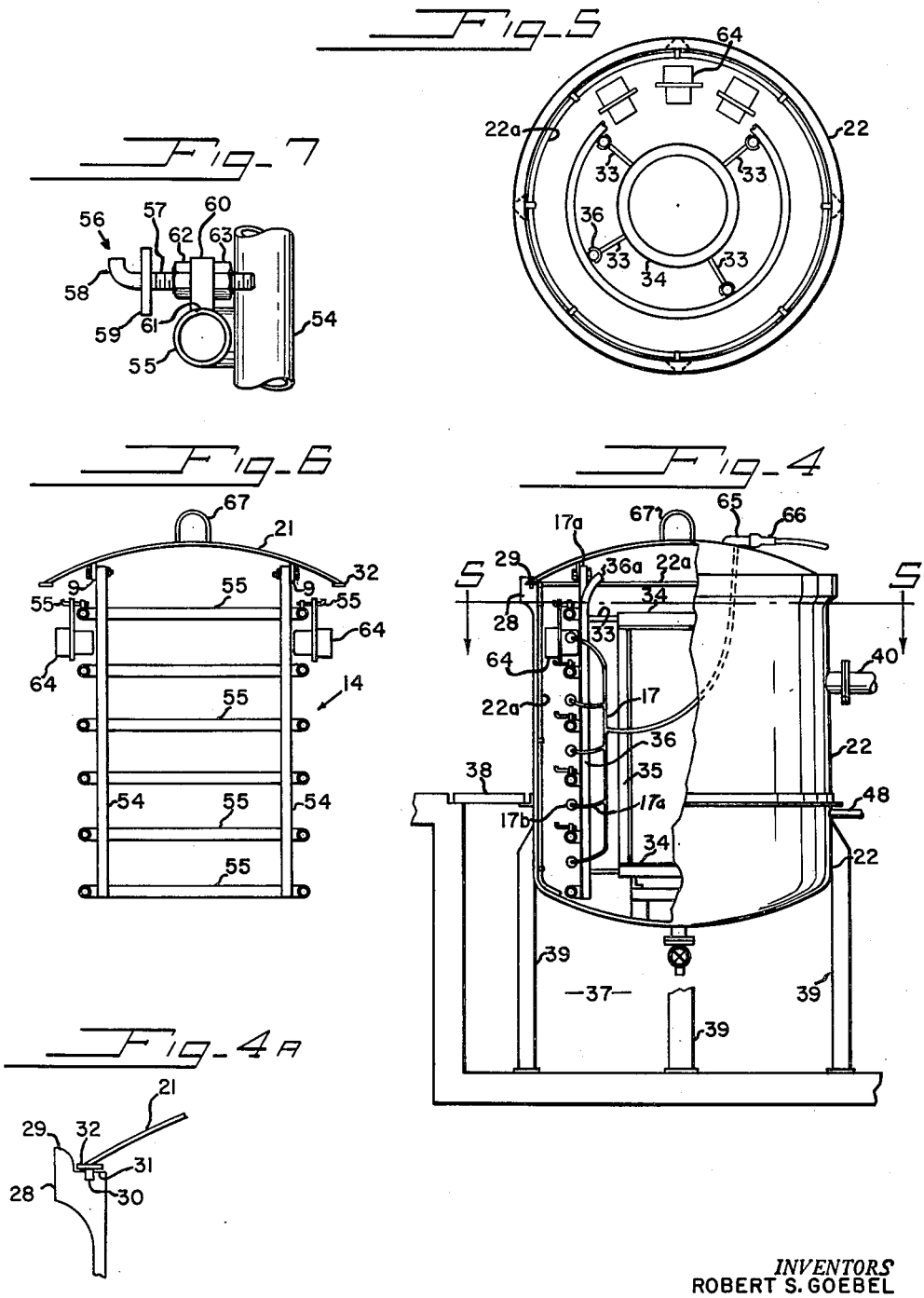

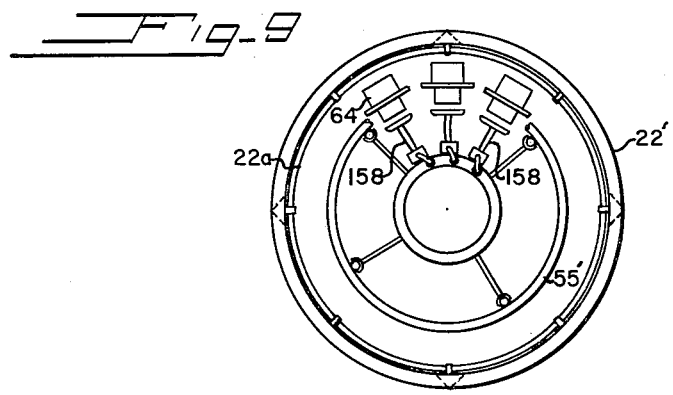
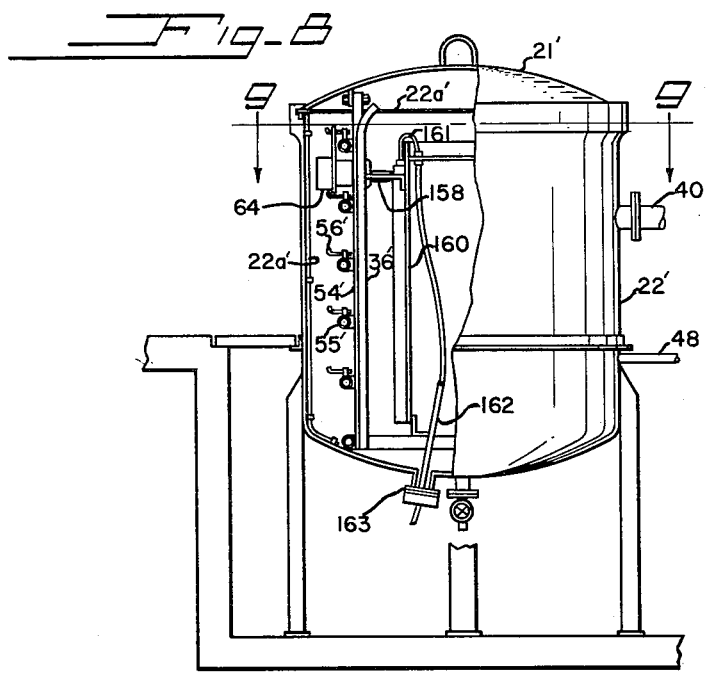

INVENTORS
ROBERT S. GOEBEL
CHARLES P. SCHOLZ
BY DES JARDINS, ROBINSON, TRITLE & SCHENK
THEIR ATTORNEYS

United States Patent Office 3,006,077
Patented Oct. 31, 1961

3,006,077
APPARATUS FOR DEHYDRATION OF REFRIGERATION HERMETIC COMPRESSORS
Robert S. Goebel and Charles P. Scholz, Kettering, Ohio, assignors to Production Control Units, Inc., Dayton, Ohio, a comporation of Ohio
Filed Mar. 3, 1958, Ser. No. 718,668
10 Claims. (Cl. 34—48)

This invention relates generally to dehydration apparatus and more particularly to apparatus for dehydrating hermetic motor-compressors used in refrigeration systems.

A major problem in the refrigeration industry today exists in the process of reducing moisture contained on the components of refrigeration systems to a very low value. It has been found that a relatively large portion of the potential moisture exists in the windings and associated electrical parts of the motor-compressor or hermetic-compressor. Specific dehydrating processing must be undertaken to dry this portion of the refrigeration circuit. Some manufacturers obtain dehydration by the application of heat and vacuum to the entire refrigeration circuit. Another method consists in drying the refrigerator system components, such as the motor-compressor, condenser, tubing, evaporator, etc., individually to a very low level of moisture content and then assembling said pre-dried components. A common practice for drying motor-compressors is to connect an opening in each individual motor compressor to suitable means for inducing a vacuum within the motor-compressor and then placing the motor-compressor in an oven, wherein, it is subjected to oven temperatures of 250 to 300° F. This dehydrating process requires that each motor-compressor be connected with a vacuum line which involves substantial hand operation by an operator in connecting the vacuum lines to the individual motor-compressor units and a great deal of difficulty is experienced with leaks at the connection of the motor-compressor and the vacuum line. Therefore, it is an object of the present invention to eliminate the necessity of providing a vacuum tight connection for each individual motor-compressor as presently required and further to eliminate the costly and time consuming hand operations incident therewith.

Another object of the present invention is to provide a large vacuum vessel adapted to receive a pre-loaded rack containing a plurality of motor-compressors and thereby eliminate costly, hard to maintain, vacuum-tight connections, between each motor-compressor and vacuum line, since the motor-compressors themselves are immersed entirely within a vessel in which a vacuum has been induced, thereby substantially eliminating the problem of leaky connections and other plumbing difficulties.

Another object of the present invention is to provide a large vacuum vessel into which a pre-loaded rack of motor-compressors may be inserted, means for passing an electrical current through the motor-windings of each motor-compressor in the vacuum-vessel, and control means to insure that the motor-windings do not exceed a safe maximum temperature.

Another object of the present invention is to provide a novel apparatus to heat a plurality of motor-compressor units while containing these in a common vacuum vessel, and insuring that the motor-windings do not exceed a safe temperature by providing novel control means whereby the temperature of the motor-windings is automatically tested for a few seconds out of each minute to determine whether the motor-windings are being maintained at a proper temperature and means for automatically shutting off the current during the next time interval if the temperature is too high and permitting the current to flow during next time interval if the temperature is too low.

Still another object of the present invention is to provide novel apparatus for dehydrating motor-compressors which includes a large vacuum vessel adapted to receive a pre-loaded rack containing a plurality of motor-compressor units thereon, said rack having a lid for said vacuum vessel integrally secured thereon and said rack adapted for insertion into said vacuum vessel whereupon said lid engages in sealing contact with the open end of said vacuum vessel, the total weight of said rack, said load of motor-compressors and said lid insuring a better seal between said lid and the open end of said vacuum vessel.

Still another object of the present invention is to provide novel control circuit means whereby the temperature of a plurality of motor-windings which are being heated are automatically tested at predetermined intervals, said control means, including means for automatically disabling the heating means if said motor-compressor windings are found to be too warm during said test intervals or permitting the heating to continue if found too cold during said test intervals.

Another object of the present invention is to provide a system for dehydrating motor-compressor units which utilizes direct electrical heating of the windings of the motor-compressor including a rack designed to support a plurality of such motor-compressors, a wiring harness for said motor-compressors, said wiring harness associated with said rack, quick electrical connectors between said harness and each of said motor-compressor units comprising a male portion which is preferably a part of the motor-compressor unit and a socket portion which is preferably part of the wiring harness, whereby said harness and said motor-compressor unit may be easily and quickly connected together by an operator.

A further object of the present invention is to provide a novel apparatus for dehydrating motor-compressors which is operated by loading a plurality of motor-compressors on a supporting rack, connecting the motor windings of each motor-compressor to a wiring harness on said rack, placing said rack and its load of motor-compressors within a vacuum vessel, connecting said motor-windings by means of said harness with a source of electrical energy, inducing a vacuum within said vacuum vessel, passing an electrical current through said wiring harness into the motor-windings of each motor-compressor, maintaining a temperature of approximately 300° F. within said motor-windings, periodically testing said temperature in each of said motor-windings, breaking said vacuum by supplying dry air or nitrogen into said vacuum vessel prior to the removal of said rack of dehydrated motor-compressors from said vessel and sealing each of said dehydrated motor-compressors to prevent reaccumulation of moisture therein.

A further object of the present invention is to provide dehydrating apparatus for motor-compressors comprising in combination a vacuum vessel open at one end thereof, a rack for supporting a plurality of motor-compressors and adapted to be inserted within said vessel, a lid for said vacuum vessel adapted to form a vacuum tight closure for said open end of said vacuum vessel, said lid integrally connected with said rack whereby upon insertion of said rack within said vacuum vessel the combined weight of said rack, its load and said lid urge said lid into a sealing engagement with the open end of said vacuum vessel, means for inducing a vacuum within said vacuum vessel, radiant heating means for heating said motor-compressors, and control means for maintaining a desired temperature within said motor-compressors.

Another object of the present invention is to provide a novel control circuit for heating motor-compressor units within permissive temperature ranges without the necessity of providing a very large, high cost, voltage stabilizing unit, for stabilizing the voltage thereof.

Another object of the present invention is to provide novel apparatus for dehydrating motor-compressors characterized by its structural simplicity, the ease of assembly of its parts, its strong and sturdy nature and its low manufacturing cost. Other features of this invention reside in the arrangement and design of the parts for carrying out their appropriate functions.

Further objects of the present invention and certain practical advantages will be referred to in or will be evident from the following description of two embodiments of the invention, as illustrated in the accompanying drawings, in which:

FIG. 1 is a diagrammatic view of the floor plan showing the relative locations of a plurality of the vacuum vessels, a conveyor system adapted to supply incoming motor-compressor units, rack loading and unloading station and an overhead bridge crane for transporting the loaded rack to the vacuum vessels.

FIG. 2 is a cross-sectional view taken along the plane of line 2—2 of FIG. 1 and diagrammatically showing the relative positions of the components recited in FIG. 1 above.

FIG. 3 is an enlarged diagrammatical view of a single vacuum vessel and its associated vacuum pump, pump motor, valves, motor-compressor, supporting rack, recording means, etc., and the required basic plumbing for connecting these components together.

FIG. 4 is an enlarged side elevational view of a vaccum vessel with parts thereof broken away to more clearly show the interior thereof, wherein, the motor-compressor supporting rack and integrally connected lid are shown in an assembled position.

FIG. 4–A is an enlarged fragmentary view showing in detail the sealing engagement between the open end of the vacuum vessel and its lid.

FIG. 5 is a transverse sectional view taken along the plane line of 5—5 of FIG. 4 and showing the supporting rack for the motor-compressor in an operative position within the vacuum vessel.

FIG. 6 is an enlarged side elevational view showing the motor-compressor supporting rack integrally connected to the vacuum vessel lid, with a plurality of motor-compressor units supported thereon.

FIG. 7 is an enlarged fragmentary detail view showing a typical retaining hook by which the motor-compressors are secured to the rack of FIG. 6.

FIG. 8 is an enlarged side elevational view with parts broken away, of a modified embodiment of the invention wherein radiant heating units are placed within the vacuum vessel for heating the motor-compressor units after they are positioned within the vacuum vessel.

FIG. 9 is a transverse sectional view taken along the plane of line 9—9 of FIG. 8 with the lid removed, and showing the rack together with a plurality of motor-compressor units supported in an operative position within the vacuum vessel, disclosed in FIG. 8.

Figure 10:
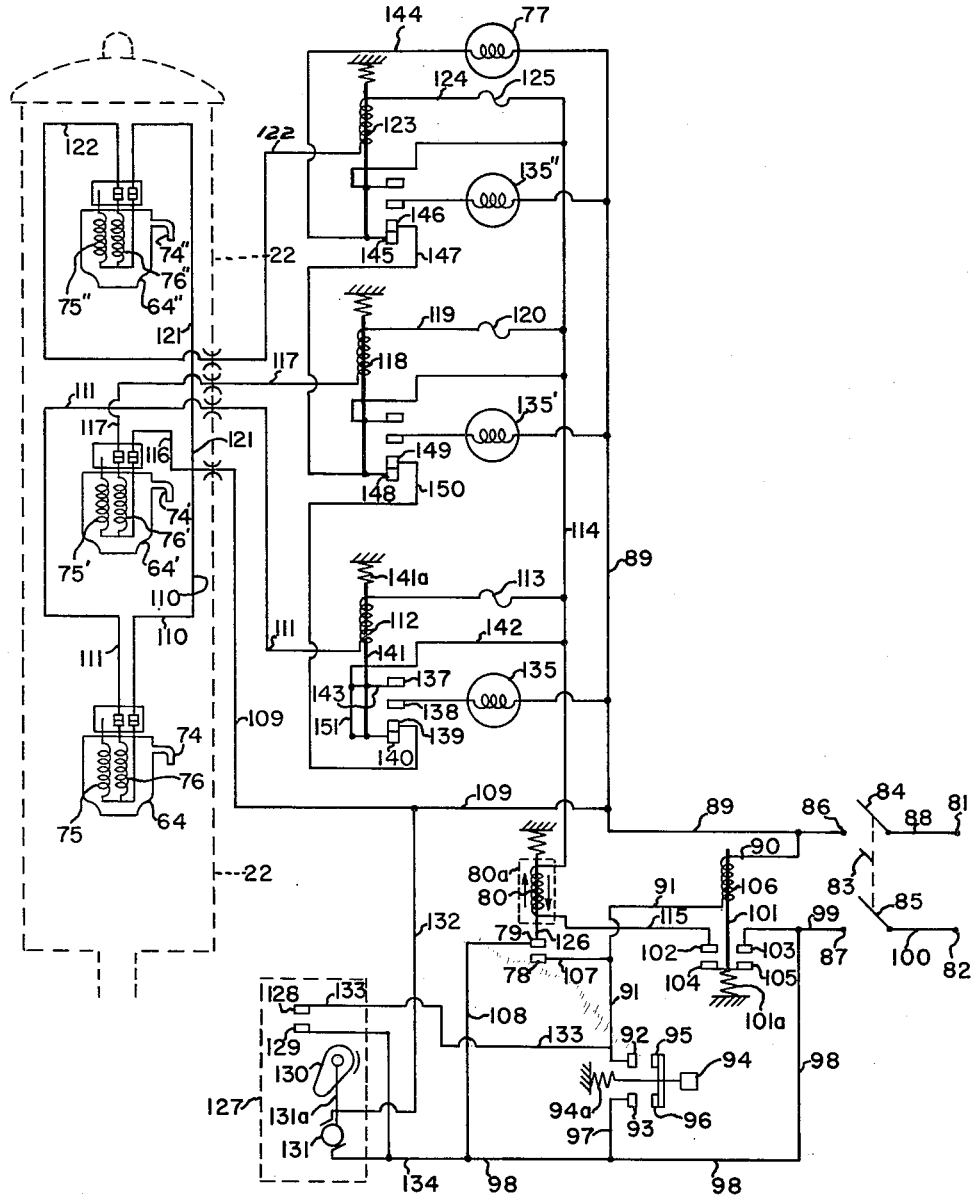

FIG. 10 is an electrical diagram showing the heating and safety circuits adapted to be used with the embodiment of the invention shown in FIGS. 4 and 5.

Figure 11:
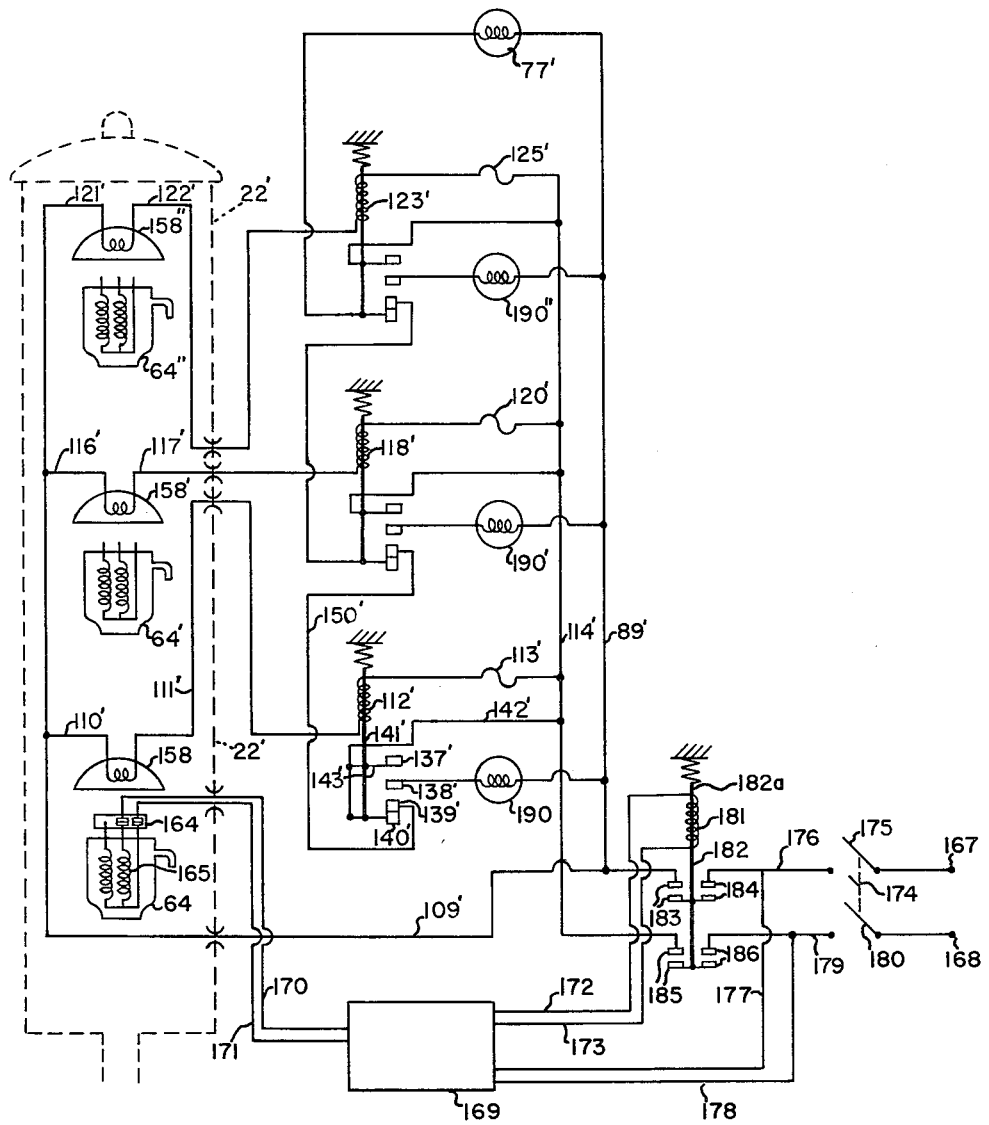

FIG. 11 is an electrical diagram showing the heating and safety circuits for the radiant heating units as disclosed in the embodiment of the invention shown in FIGS. 8 and 9.

FIG. 12 is a time-temperature graph illustrating the heating cycle of the present invention.

Before describing in detail the herein disclosed embodiments of the invention, it is to be understood that the present invention is not limited to the structural details or the particular arrangement of parts herein shown, as devices embodying the present invention may take other forms. It also is to be understood that the phraseology and terminology herein used are for purposes of description and not of limitation, as the scope of the present invention is denoted by the appended claims.

In order that the invention may be more readily understood, a general description will first be given, followed by a more detailed explanation of the invention.

With reference now to FIG. 1, two turn-tables are provided, turn-table 10 for loading and turn-table 11 for unloading the motor-compressor units from a suitable supporting rack. The motor-compressors are supplied adjacent turn-table 10 and removed from a position adjacent turn-table 11 by means of overhead monorail conveyors 12 and 13 respectively. The turn-tables are adapted to support motor-compressor supporting rack 14 as seen in FIG. 6 which it is contemplated will contain as many as 65 motor-compressors or more, in five tiers of approximately 13 each. Therefore, it is advantageous that means for rotating the rack be provided so that it may be conveniently loaded and unloaded by the operator standing at positions 15 or 16 respectively. The turn-tables are preferably constructed with anti-friction bearings to permit turning by hand or they may be powered by a reversible motor or any other suitable means and may even include a jacking device for raising and lowering the turn-tables so that the various tiers or layers of the rack may be presented to the operator for easy placement of the motor-compressor units upon the rack. The specific means for rotating the turn-tables or raising and lowering the turn-tables form no part of this invention and therefore will not be illustrated or described. It is of course desirable that the motor-compressor supporting means on the rack always present themselves to the operator at a fixed working point.

After the operator has loaded the racks with the desired number of motor-compressor units, he then connects each compressor unit to the wiring harness 17 which forms a part of the rack, as seen in FIG. 4.

The loaded rack is then transported by means of a bridge crane 18, which travels along spaced tracks 19 and 20, and moved into a position above an empty vacuum vessel 22. The bridge crane is then operated so as to lower the loaded rack into the empty vacuum vessel. Each supporting rack 14 is integrally connected with a lid 21 which closely fits and seals off the open end of the vacuum vessel as the rack is lowered into said vessel.

Six vacuum vessels 22 are shown. They are all identical and their number may be increased or decreased depending upon the quantity of production required.

Associated with each vacuum vessel 22 is a vacuum pump 23 which is driven by an electrical motor 24 together with the necessary valves and controls and power supply means to create within each vacuum vessel, a vacuum which approaches absolute zero pressure.

Electrical control circuit means such as shown in FIG. 10 is provided for applying a current flow through the motor winding of the motor-compressors so that they become heated to a temperature of approximately 300° F. Means are provided to arrive at this temperature as quickly as possible and then hold the cycle for a required period of time. Means are also provided in the circuit shown in FIG. 10 wherein the temperature of the motor winding is tested for a certain period out of every minute to determine whether the motor windings are being maintained at a proper temperature. If too warm the current is automatically shut off during the next interval and if too cold the current is automatically permitted to flow during the next interval.

Upon completion of the desired dehydration cycle, which may be in the order of 1½ to 2½ hours, the vacuum in the vessel is broken with dry air or nitrogen. The rack and its integrally associated lid are then removed from the vacuum vessel by means of bridge crane 18 and transported to the unloading turn-table 11. As in the case of loading, the rotatable turn-table 11 will facilitate unloading of the motor-compressors from the rack 14 and placement on the monorail conveyor 13.

As seen in FIGS. 4 and 5 each vacuum vessel 22 is shown in a generally cylindrical form which is open only at its upper end. It will of course be understood that we do not intend to limit the shape of the vessel and forms other than cylindrical may be used. The interior surface of the vacuum vessel is provided with a reflective shield 22a made preferably but not necessarily of polished aluminum which has the effect of reducing radiation and heat losses. The upper end of the vessel is provided with a reinforced outwardly flared portion 28 which is provided with an upstanding rim 29 having a diameter somewhat greater than the diameter of the lid 21. A sealing ring 30 is inserted in a groove contained in the flat surface 31 of the flanged portion 28 as seen in FIG. 4a and extends circumferentially around the entire upper edge of the vessel 22. The lid 21 is provided with a circular ring member 32 which extends completly around its outer circumference and is adapted to engage in sealing relationship with the sealing ring 30 which normally projects slightly above the surface 31. The upstanding rim 29 provides somewhat of a guide means for the lid 21 as it is placed into sealing engagement with the open end of the vessel. As seen in FIGS. 4 and 5 the interior of the vacuum vessel 22 is provided with a frame work which is adapted to provide guide means for the rack 14 during insertion of the rack into the vessel. The frame work consists essentially of a plurality of radially extending arms 33 which project outwardly from a pair of vertically spaced circular frame members 34 which are supported by upright members 35 in the central region of the vessel 22. The radially extending members 33 support at their distal ends vertically upright substantially U-shaped channel guide members 36 which are adapted to register with complementary frame members of the rack 14 and guide the rack into the desired position within the vessel, during insertion of said rack into the vessel.

So that the operation of inserting the rack within and removing the rack from the vacuum vessel may be effectively and efficiently handled by an operator, each vacuum vessel is placed in a pit 37, as seen in FIGS. 2 and 4, and surrounded with a floor grating 38. The space within the pit provides room for the plumbing, wiring, etc., which are used in connection with the apparatus. As seen in FIG. 4 the vacuum vessel 22 is supported on four vertically upstanding legs 39.

Each vacuum vessel 22 is provided with its own means for inducing a vacuum therein. As seen in FIG. 3 the vacuum pump 23 is driven by motor 24 and is connected by pipe 40 through a valve 41 to the interior of the vacuum vessel 22. A source of dry air or nitrogen is provided in a suitable reservoir 42 preferably under pressure and is adapted to pass thru line 43 by means of an adjustable pressure reducer 44 the pressure of which may be read by means of gauge 45 and admitted by means of valve 46. The dry air or nitrogen is used to break the vacuum in the tank after the dehydration process is complete. In normal operations valve 46 is closed and valve 41 is open so that the vacuum pump 23 may produce a vacuum within the vacuum vessel 22. At the end of the dehydration period valve 41 is closed, which is effective in isolating the vacuum pump 23 and then valve 46 is opened thus permitting the nitrogen or dry air at a regulated final pressure to "break" the vacuum in vessel 22 so that the processed load of motor-compressors may be removed.

A vacuum chart recorder 47 of any conventional type is connected to the interior of the vacuum vessel by means of pipe 48 and continuously charts the vacuum within the vacuum vessel so that the operator may know of its condition at all times.

The vacuum chart recorder 47, valves 41 and 46, gauge 45 together with the vacuum pump and motor 23 and 24 are preferably located adjacent or within the main control panel 50, shown in FIG. 1. It will be understood that each vessel 22 is provided with a control panel 50 (the purpose of which will hereinafter be described) and its own vacuum producing and breaking equipment. The three vessels shown on the left side of FIG. 1 are also equipped with control stations (not herein shown) similar to those shown at 51, 52 and 53.

The structural details of the motor-compressor supporting rack 14 are shown in FIG. 6. The rack is seen to consist of a plurality of circumferentially spaced vertically extending frame members 54 and a plurality of horizontally disposed vertically spaced circular frame members 55 rigidly secured to the upright vertical frame members 54 at different elevations.

Rigidly mounted to the frame members 55 are a plurality of circumferentially spaced radially outwardly projecting adjustable supporting hooks 56 which provide means for hanging the motor-compressors upon the rack as seen in FIG. 7. The hook consists of an elongated threaded body portion 57 having a hooked end 58 thereon, and an abutment plate 59 located adjacent the hooked end 58. An upstanding support bracket 60 is rigidly secured to the frame member 55 at 61 and is adapted to receive the threaded portion of the body portion 57. A pair of nuts 62 and 63 threadedly engaging the threaded body portion 57 lie on either side of the support bracket 60. Thus, by loosening the nuts 62 adn 63 the body portion 57 may be moved radially inwardly or outwardly with respect to the frame member 55 to any desired position. Upon tightening the nuts 62 and 63 into close engagement with the support bracket 60 the hook will be rigidly retained in any desired position of adjustment. It is presently contemplated that a plurality of 13 such hook members 56 will be equally spaced circumferentially about each circular frame member 55. The vertical spacing between adjacent circular frame members 55 is such as to accommodate the particular size motor compressor to be dehydrated. As seen in FIG. 6, motor-compressors 64 are shown hanging in a proper position from the hooks 56 on the uppermost frame member 55.

Another novel feature of the present invention resides in the provision wherein the lid 21 is integrally connected to the rack 14. As seen in FIG. 6 the lid is provided with a plurality of depending bracket members 9 which are adapted to be rigidly secured to the upper ends of the upright frame members 54 by welding, bolting or any other suitable means. The rack member 14 is so constructed that its outer circumference when loaded with motor-compressor units, is smaller than the inner diameter of the vacuum-vessel 22. Through the provision of an integrally connected rack and lid a better seal is achieved when the rack is inserted within the vacuum vessel 22. This is necessarily true because the combined weight of the rack 14, the total weight of the motor-compressor load carried by the rack, and the lid force the outer peripheral edge 32 of the lid 21 into very tight sealing engagement with the sealing ring 30. The rack 14 is so constructed that when the lid 21 is in sealing engagement with the seal 30 of the vacuum vessel 22 the lower end of the rack does not bottom in the vacuum vessel, so that the combined weight of the motor-compressor load, the rack 14 and the lid 21 as heretofore mentioned tend to force the lid 21 into vacuum tight sealing engagement with the sealing ring 30. By means of this novel construction I have eliminated the necessity of providing clamps or other securing means for holding the lid in sealing engagement with the open end of the vacuum vessel. Here a vacuum tight seal is automatically provided when the operator inserts the rack into the vacuum vessel. There need be no additional clamping of the lid into place as would be required if the lid were constructed separately from the rack, since the weight of the lid alone is normally not enough to create a vacuum tight seal with the open end of the vacuum vessel 22.

The vertical upright frame members 54 are so spaced as to register with and be received within the U-shaped channel guide members 36 during insertion of the rack within the vacuum vessel. The U-shaped members 36 are curved inwardly at their upper ends 36a so as to provide an easy start for the rack as it is brought into registry with the upper ends of the U-shaped members.

Each rack 14 is provided with a wiring harness 17, as shown in FIG. 4. As the rack 14 is being loaded, each motor-compressor is connected to the wiring harness 17. This connection is made by using any standard quick connector wherein preferably but not necessarily the male portion is made a part of the motor-compressor unit and is in effect an outlet for the motor windings contained therein. The female or socket portion of the quick connection would then be an integral part of the rack wiring harness. It will be understood that the wiring harness 17 would have a lead 17a containing a socket portion 17b for each motor-compressor unit contained on the rack. The wiring harness 17 is constructed so that the leads from all motor-compressors 64 are brought upwardly into a single multiple plug 65 which is located exteriorly of the lid 21. In other words, the leads are brought upwardly through the lid 21 and terminate in any standard type multiple plug 65. The multiple plug 65 is adapted to be received within a multiple socket 66 which is permanently located adjacent the vacuum vessels 22. It should be understood that the lead line 17a from each motor-compressor 64 is insulated from the lead line of every other motor-compressor unit but is formed into a harness 17 in order to facilitate the ease of passing a single conduit through the lid 21. The reason for maintaining a lead line and a circuit for each individual motor-compressor 64 will hereinafter become apparent.

The bridge crane 18 is constructed so as to permit the operator to engage the loop member 67 which is rigidly connected to the outer surface of the lid 21 with the crane hook 68 and transport the loaded rack to a position above an empty vacuum vessel and then lower it into a proper position within the vacuum vessel. As seen in FIGS. 1 and 2 spaced tracks 19 and 20 extend adjacent the vacuum vessels 22 and the turn-tables 10 and 11. A transversely extending bridge member 69 has each of its ends supported on said tracks by means of suitable end trucks 70 and 71. The bridge crane may be a standard electric traveling crane of the type produced by the Robbins & Myers Company of Springfield, Ohio, and one which is capable of both longitudinal and transverse movement. The movement of the hook member 68 is controlled by a push button unit 72 which permits the operator to move the crane either longitudinally along the side rails 19 and 20 or transversely across the bridge member 69, or by suitable hoisting mechanism 73 may cause the hook 68 to travel either up or down.

Following the loading of a rack on turn-table 10 by an operator located at station 15 the operator causes the bridge crane to pick up the loaded rack and place it in an empty vacuum vessel. After the vacuum vessel is loaded and sealed the dehydration cycle is set into operation by starting motor 24 which drives vacuum pump 23. The dehydration cycle is controlled by the control unit 50 which houses temperature, current and safety control circuit means which will now be described.

In FIGURE 10 we have shown an electrical circuit diagram wherein current is passed through the motor windings in order to heat said windings and associated motor compressors. At the left of the circuit diagram within the vacuum vessels 22 shown in dotted lines are illustrated three typical motor-compressors 64, 64' and 64". It will be understood that the three motors herein shown are merely typical of the total motor-compressor load contained on the rack 14 since it would serve no additional purpose and would merely confuse the picture, to duplicate the illustration of 65 or more motor-compressor circuits. It will be understood however, that one or more motor-compressors may be processed at a time.

The motor-compressor units 64, 64' and 64" are provided with processing tubes 74, 74' and 74" respectively which have one end in communication with the interior of the motor-compressor unit and the other end open to the atmosphere within the vessel 22. Thus, any change in the pressure in the vacuum vessel is communicated to the internal parts of the compressor. If a vacuum condition exists within the vacuum vessel 22 then a vacuum condition must also exist within the internal space of the motor-compressor unit.

As previously recited the motor-compressors are first loaded on the rack 14 and then lowered into the vacuum vessel 22, the electrical connections having been made by means of quick connections 17b and leads 17a which lead outwardly through the lid 21 by means of the harness 17. The wiring harness which includes all of the electrical leads inside the vacuum vessel is thus brought outside the vacuum vessel through any suitable vacuum tight insulated means provided in the lid 21.

Complete and efficient dehydration of the motor-compressors is accomplished by evacuating the interior chamber of the vacuum vessel 22 and generating heat within the motor-compressors by passing a current through the motor-windings thereof. The start motor-windings 75, 75' and 75" may be used instead of the run motor-windings 76, 76' and 76" or combinations of both may be used if desired.

Safety control means must be incorporated in the electrical circuit so as to protect the windings of the motor against damage, as would occur should the temperature go over 300° F. or at the most 325° F. In order to insure that this safe temperature is not exceeded, safety control means is built into the equipment.

The safety control circuit contemplates the use of a master control light 77 which indicates whether or not there is any trouble in the circuit, and if such trouble is indicated by the master light, the operator may then quickly check additional signal lights which indicate the specific portion of the circuit that is causing the trouble. The control circuit further contemplates safety-control means which automatically break the circuit should the temperature of the motor-compressors exceed a safe temperature. Timing means are provided for re-establishing the circuit for a period such as two seconds out of each minute and if the temperature is too warm the current is automatically shut off during the next fifty-eight (58) seconds and if too cold the current is automatically permitted to flow during the next fifty-eight (58) seconds. It will be understood that the time of the interval may be varied as desired.

The method of assuring that a safe temperature is not exceeded in the motor-compressors is by checking the amount of current flowing through the motor-windings with a stabilized voltage being applied. An on-off control illustrated by contacts 78 and 79 is caused to operate as the result of a change in the total current through the coil 80 of a current relay 80a. It being understood that the electrical circuit is connected at 81 and 82 to a voltage stabilized electrical source of power, not herein shown. As the current begins to flow through the motor windings 76, 76' and 76", say at room temperature, the windings heat up and as a result of heating their resistance to current flow increases, thus as the windings heat the current flow decreases or drops off. The change in the total amount of current flowing through coil 80 of current relay 80a, is used to open or close the main circuit and thereby turn the heating power on and off. Thus, if it is established ahead of time the level of current flow which corresponds to a resistance in the motor windings at 300° F. then it is possible to use this predetermined level of current flow as a means of control to cut off the current flow, by means of relay 80a, when the current flow falls to this predetermined level. In order for the circuit of FIG. 10 to become operative the main switch 83 must be closed so that the switch arms 84 and 85 engage contacts 86 and 87 respectively thereby closing a circuit from power source 81 through line 88, line 90, solenoid relay coil 106, line 91, contacts 92 and 93 (when push button 94 is momentarily pressed it closes a circuit through contacts 95 and 96 associated with said push button) line 97, line 98, line 99, switch arm 85, line 100 and power source 82. Energization of coil 106 actuates arm 101 against the force of spring 101a which normally urges arm 101 into an open contact position, as seen in FIG. 10, and thereby closes contacts 102, 103, 104, 105 respectively. At this time, contacts 78 and 79 close as will be described hereinafter. Upon closures of contacts 78 and 79 current will flow through a new circuit by means of line 90, coil 106, line 91, line 107, closed contacts 78 and 79, line 108, line 98, line 99 and switch arm 85, line 100, and power source 82. The current continues to flow through this new circuit established through contacts 78 and 79 even though push button 94 is released and contacts 92, 93 and 95, 96 respectively are opened by spring 94a which normally urges push button 94 and its associated contacts into a circuit breaking position.

Upon closure of contacts 102, 103 and 104, 105 respectively, in response to energization of solenoid coil 106, a circuit, is immediately established through line 89, line 109, line 110 contained in the vacuum vessel through the quick connection in the motor-compressor unit 64 to motor run winding 76, line 111, solenoid coil 112, fuse 113, line 114, relay control coil 80, line 115 contacts 102, 103 and 104, 105, line 99, switch arm 85 to power source 82. This circuit provides current flow from the power source 81 and 82 through the motor winding 76 in the motor-compressor 64 and heats the winding of the motor and thereby increases the rate of evaporation and drying of moisture within the motor-compressor.

Similar circuits through symmetrical paths are simultaneously established through the other two motor-compressors 64' and 64" as shown. Thus, a circuit would be established through motor-compressor 64', from power source 81, through line 88, arm 84, line 89, line 109, line 116, winding 76', line 117, solenoid coil 118, line 119, fuse 120, line 114, relay coil 80, line 115, contacts 102, 103 and 104, 105, line 99, switch arm 85, line 100, and power source 82.

Similarly a circuit would be closed through the motor winding 76" of motor-compressor 64" from power source 81, through line 88, arm 84, line 89, line 109, line 121 in the vacuum vessel 22, winding 76", line 122, solenoid coil 123, line 124, fuse 125, line 114, relay control 80a and coil 80, line 115, contacts 102, 103 and 104, 105, line 99, switch arm 85, line 100 to power source 82. It will be understood that each of the motor-compressor units contained on the rack 14, regardless whether they number 1, 65, or more, has a circuit similar to the three heretofore described. Although the circuit lines within the vessel are actually brought outwardly through the lid 21, in FIG. 10 I have shown them as passing through the side walls of the vessel 22 for purposes of clarity.

It will be noted that the total current of all the motor windings 76, 76' and 76" is caused to flow through the relay control 80a and coil 80. As the current flows through the windings 76, 76', and 76" the motor-compressors, contained on the rack gradually heat up. As previously mentioned upon a temperature rise in said windings, the current flow decreases due to increased resistance in the windings, thus, the amount of current flowing through coil 80 also decreases. The current relay 80a of which coil 80 is the control means, is previously set for a predetermined amount of decreased current flow which will open contacts 78 and 79. The particular setting of the current relay is determined by taking into consideration the characteristics of the motor-compressor windings, the total number of motor-compressors in the load, the desired temperature of the windings, and the voltage at the power source 81 and 82. As the motor windings continue to heat and finally reach a predetermined temperature, the control current relay having been previously set in consideration of the above-mentioned factors, causes the contacts 78 and 79 to open when the desired temperature in the motor windings is reached. Thus, as a result of the reduced current flow through relay coil 80 contacts 78 and 79 open thereby breaking the circuit through line 107, line 91 and coil 106. Upon de-energization of coil 106, spring 101a opens contacts 102, 103 and 104, 105 breaking the closed circuits through the motor windings 76, 76', and 76" and thereby causing heating of said motor windings to cease.

As the motor windings 76, 76' and 76" begin to cool, due to heat loss by radiation and conduction, to the cooler parts of the motor-compressor units it is necessary that means be provided to restore the heating current. This is done by a conventional flasher unit 127 consisting of normally opened contacts 128 and 129 which are periodically closed by cam 130 which is continuously driven by motor 131 through shaft 131a. Motor 131 runs continuously so long as main switch 83 is closed because of a circuit which is established from power source 81, line 88, arm 84 tthrough line 89, line 109, line 132, motor 131, line 98, line 99, switch arm 85 and power source 82. Cam 130 is adjusted so that it will rotate so that contacts 128 and 129 are closed for several seconds during each minute. Upon closure of contacts 128 and 129 a circuit is established through line 133, line 91, coil 106, line 90, line 89, switch arm 84, line 88 and power source 81 and completed through line 134, line 98, line 99, switch arm 85, and power source 82. Thus, in this instance the closure of contacts 128 and 129 have the same effect as closing contacts 92, 93, 95, and 96 by means of push button 94. Upon completion of said circuit solenoid coil 106 is energized and actuates arm 101 against the force of spring 101a and closes contacts 102, 103 and 104, 105 so that current may again pass through the various motor windings.

Assuming now that the temperature of the motor has reached a point where when power is reapplied there would again be a current flow great enough to cause coil 80 to close contacts 78 and 79. As previously stated during each revolution of the flasher cam 130, contacts 128 and 129 are closed for several seconds out of each minute, whereby, coil 106 upon being energized closes contacts 102, 103 and 104, 105 to permit current to flow to the motor windings. For such time that the heating current flow is great enough to keep contacts 78 and 79 closed by means of relay 80a and coil 80 the heating current will flow until the motor-compressor windings again reach the desired temperature at which time the relay 80a will cause contacts 78 and 79 to again open.

Means is provided to indicate broken circuits to any of the motor windings since such broken circuits would fail to heat such winding. For this purpose signal lights 135, 135' and 135" are provided in proper circuits, hereinafter described, for motor-compressor units 64, 64' and 64" respectively. Said signal lights are located on the control panel 50, as seen in FIG. 1, and master signal light 77 is also provided on the control panel 50 to indicate any failure in the motor-compressor heating circuits.

Solenoid coil 112 is a part of a conventional relay having operating contacts 137, 138 and 139, 140 which are actuated by means of lever arm 141 which is responsive to energization and de-energization of coil 112. A spring 141a associated with arm 141 normally urges said arms into a position wherein contacts 137 and 138 are open and contacts 139 and 140 are closed. When heating current flows through motor winding 76, coil 112 is energized and actuates lever arm 141 against the force of spring 141a to cause contacts 139 and 140 to close and contacts 137 and 138 to open. Should current fail to flow through motor winding 76 then coil 112 is de-energized and spring 141a causes contacts 137 and 138 to close and contacts 139 and 140 to open. When contacts 137 and 138 close a circuit is established from line 114 through line 142, line 143, through closed contacts 137 and 138, lamp 135 to line 89 and such closed circuit results in the lighting of signal lamp 135. As heretofore explained there will be voltage present on lines 114 and 89 during the heating cycle.

It will be further noted that when contacts 139 and 140 open in response to de-energization of coil 112 and the action of spring 141a due to the failure of the current in the circuit to the motor-compressor motor winding 76, master signal lamp 77 goes off because the circuit through line 89, lamp 77, line 144, contacts 145 and 146, line 147 contacts 148 and 149, line 150, contacts 139 and 140, line 151 and line 142, is broken. It will be understood that contacts 148, 149 and 145, 146 are in circuits similar to that of contacts 139, 140 and it would be merely repetitious to repeat the operation of these circuits for signal lamps 135' and 135" since they are identical to that of signal lamp 135. There are means similar to contacts 137 and 138, arm 141 and spring 141a for each motor-compressor in the load and upon failure of the heating current in any one of the motor-compressors their respective circuits will turn off master signal light 77 and turn on the individual signal light 135, 135' or 135" for the particular motor-compressor heating circuit which has failed in the same manner as described in connection with motor-compressor 64.

During operation the operator need only look at the master light 77. Should light 77 ever go out the operator knows that this indicates a failure somewhere in the circuit. He will then make a further search of the control panel to find out which particular circuit has failed and this will be indicated by the illumination of a particular lamp 135, 135' or 135". If the operator does get a failure signal by one of the lamps 135, 135' or 135" becoming illuminated then upon removing the motor-compressors from the vacuum vessels he will properly identify and label and mark the one that did not receive proper heating. For this reason it is important that the rack 14 be keyed so that it is always loaded in the same way within the vacuum vessel 22, so as to provide a constant relationship between the signal light number and the actual position of its associated motor-compressor on the rack. Such keying means take the form of the U-shaped channels 36, which receive the vertically upright frame members 54 of the rack 14. The U-shaped channels are spaced at uneven circumferential intervals within the vacuum vessel 22 and the vertically upright frame members 54 of the rack 14 are spaced to register within the U-shaped channels in only one position, during insertion of the loaded rack within the vacuum vessel as heretofore described.

With reference now to the temperature control chart shown in FIGURE 12, temperature is measured on the ordinate of the chart while time is measured on the abscissa of the chart. With the present control circuit, increased amounts of current may flow during the initial warm-up period of twenty or thirty minutes of the dehydration process which permits a quick heat up of the motor-compressor windings. After the desired control temperature of approximately 275° to 300° F. is reached the temperature is automatically maintained by the control circuits. As shown on the graph of FIG. 12 the temperature is tested at one minute intervals, said test lasting for a period of approximately two seconds out of each minute, this being the period during which cam 130 closes the contacts 128 and 133 and establishes a new circuit which re-energizes coil 106. During this period of testing the heating current would either be turned off for the next minute, if the compressors were too hot, as shown by the interval at 155, or would remain on for the next minute if the motor-compressors were not warm enough at the time of the test. As seen at 156 the current was not turned on because the temperature of the motor-windings was above the desired temperature at the time of the test. It will be further understood that during the initial heat-up period of twenty or thirty minutes a vacuum is being produced within the vacuum vessels. Thus, at the time the motor windings reach the desired operating temperature the vacuum within the vacuum vessel will have reached or will be approaching absolute pressure.

With reference to FIGURES 8 and 9 another embodiment of the invention is shown wherein heat is developed in the motor-compressor units through the facilities of standard infra-red radiant heating units generally shown at 158. The structure here is substantially identical to that heretofore described in FIGS. 4, 5 and 6 with a few variations. The rack of FIGS. 8 and 9 is substantially identical to that of FIGS. 4, 5 and 6, however, no wiring harness is included with the rack of the present embodiment. The rack consists only of the upright vertical frame members 54', the horizontally disposed circular numbers 55' with their associated hooks 56' which retain the motor-compressor units. The lid 21' is integrally connected to the rack in the same manner as heretofore described.

A frame 160 is provided within the interior of the vacuum vessel 22' and supports the circumferentially spaced radially projecting, radiant heating units 158. The radiant heating units 158 are circumferentially spaced so that each is in radial alignment with one of the motor-compressor units 64 contained on the rack, upon insertion of a loaded rack within the vacuum vessel 22'. In order to maintain this radial alignment between the radiant heating units and the motor-compressor units it is important that the rack be properly inserted within the vacuum vessel. In order to accomplish this end, the vertical upright frame members of the rack are keyed to register in only one position with the U-shaped channel supporting members 36' secured to the frame 160 as a permanent installation within the vacuum vessel 22'. The radiant heating units 158 are individually connected by means of a circuit which in turn is connected to a power source as hereinafter described. The wiring from each of these radiant heating units remains a permanent part of the frame and all leads such as 161 are brought outwardly through the bottom of the tank by means of a single conduit 162 and a vacuum-tight insulated terminal 163. The interior of the vacuum vessel 22' is also provided with a reflector shield lining 22a'.

In FIGURE 11, we have shown an electrical circuit diagram adapted for use with the embodiment of the invention shown in FIGS. 8 and 9, wherein, current is supplied to each of the individual radiant heating units 158 in order to heat the motor-compressor units. With this embodiment of the invention, only one quick connection at 164 connecting the motor-windings 165 of a single motor-compressor 64 into the circuit is needed. In the previous embodiment of the invention the windings of each of the motor-compressors was connected by a suitable heating circuit to a source of electrical energy. In the present embodiment of the invention the only purpose of connecting the motor winding of one of the motor-compressor units into the circuit is to determine the temperature of a typical motor-compressor. At the left of the circuit diagram of FIGURE 11 and within the vacuum vessel 22' are illustrated three typical motor-compressor units 64, 64' and 64" each of which is positioned adjacent a radiant heating unit 158, 158' and 158" respectively. The circuit is connected at 167 and 168 to a source of power. The basic circuits herein shown are substantially identical to those illustrated in FIGURE 10 only here we are substituting the radiant heating units for the motor windings of FIGURE 10. A conventional resistance bridge-type controller is shown diagrammatically at 169. Such instruments are manufactured by the Leeds & Northrup and Minneapolis-Honeywell companies and others and are standard items readily purchased on the open market. A typical instrument of this type would be a Leeds and Northrup Company Model R type 51611–L2–S–1046 "Indicating Recorder Controller." The device sends out a controlled signal in response to a change of resistance in motor winding 165 of test motor-compressor 64. The controller 169 is connected by means of lines 170 and 171 to motor-winding 165 and as the temperature of the winding and motor-compressor in general increases the resistance of the windings also increases, as heretofore described, and it is with regard to such resistance change that the controller 169 is responsive. When the desired temperature in the motor winding 165 is reached the controller 169 which has been previously set for this particular temperature develops a control signal over wires 172 and 173.

The controller 169 is energized when main double pole switch 174 is closed through a circuit from power source 167 through switch arm 175, line 176, line 177, line 178, line 179, switch arm 180 and power source 168. Thus when switch 174 is closed controller 169 becomes operative. As heretofore described controller 169 is so adjusted that when the resistance of motor-winding 165 is lower (that is colder than desired), controller 169 provides power to lines 172 and 173 and energizes solenoid coil 181 which actuates solenoid arm 182 and closes contacts 183, 184 and contacts 185, 186 thereby closing a circuit through lines 89' and 114'. Spring 182a normally urges said arm 182 into a contact opening position. The radiant heater 158 receives its energy via lines 109', 110', 111', solenoid coil 112', fuse 113' and line 114'. It will be noted that similar circuits of FIGS. 10 and 11 contain identical numerals with the exception that the numerals of FIG. 11 carry a prime (') mark. Similarly a circuit would be closed through radiant heating unit 158' via lines 109', 116', 117', solenoid coil 118', fuse 120', and line 114'.

A circuit would also be closed through a similar circuit including lines 109', 121', 122', solenoid coil 123', fuse 125' and line 114".

Means similar to those provided in FIG. 10 of the previous embodiment of the invention are provided to indicate a broken circuit in a particular radiant heating unit 158, 158', or 158" during the heating cycle. Each radiant heating unit and its associated circuit is provided with a signal light 190, 190' or 190". The signal lights are maintained on control panel 50 and master signal light 77' is also provided to indicate any failure in the circuits. Solenoid coils 112', 118' and 123' are responsive to current flowing through the radiant heating units. When current is flowing in the proper manner coil 112' is energized and actuates arm 141' so as to cause contacts 139', 140' to close and contacts 137', 138' to open. Should current fail to flow through the radiant heating unit 158 solenoid coil 112' would be de-energized and 137', 138' would close and contacts 139', 140' would open. This in turn would establish a circuit from line 114' through lines 142', 143', contacts 137', 138', lamp 190, to line 89' and such circuit would result in the lighting of the signal lamp 190 and the darkening of lamp 77'.

Radiant heating units 158' and 158" are controlled by means of coils 118' and 123' respectively, and their associated contacts not herein described which are effective in lighting lamps 190' and 190" respectively, upon failure of a circuit through the radiant heating units. The operation of the circuits which control lights 190' and 190" is identical to that heretofore described with respect to radiant heating unit 158 and lamp 190 and it wiuld be repetitious to describe such circuits. Since power lines 89' and 114' receive their power from power source 167 and 168 through contacts 183, 184 and 185, 186 and further since radiant heaters 158, 158' and 158" receive their power from lines 89' and 114', the action of controller 169 on solenoid coil 181 is effective in turning the radiant heat units on and off to maintain the desired temperature in the motor-compressor units 64, 64' and 64". Since the characteristics of the radiant heat units and motor-compressors and their physical relationship to each other, is the same for all groups in the load, the effect of the heat produced by the radiant heating units 158' and 158" on motor-compressors 64' and 64" respectively will be the same as radiant unit 158 on motor-compressor 64, therefore, sensing the heat effect on motor winding 165 of motor-compressor 64 will satisfy all motor-compressors located in other positions in the load.

It will be understood that the operation of the controller 169 is continuous so that immediately upon increased resistance to the current flow through the winding 165 of the test motor-compressor unit 64 (this being indicative of higher temperatures), the controller 169 automatically breaks the circuit by means of de-energizing solenoid coil 181 which permits spring 182a to open contacts 183, 184 and 185, 186 as heretofore described, and thereby cutting off the heating current to all of the radiant heating units 158, 158' and 158". Immediately upon a decrease of resistance to current flow through the motor winding 165 the controller 169 automatically energizes solenoid coil 181 so as to close the contacts 183, 184 and 185, 186 so that the current may again flow through the circuit to the radiant heating units.

In view of the foregoing description, taken in conjunction with the accompanying drawings, it is believed that a clear understanding of the construction, operation and advantages of the present apparatus will be quite apparent to those skilled in this art.

Having thus described our invention, what we claim as new and useful and desire to secure by United States Letters Patent, is:

1. Dehydrating apparatus for motor-compressors comprising in combination a turn table forming a loading station, a rack removably supported on said turn table and adapted to receive and retain a plurality of motor-compressors, conveying means for supplying said motor-compressors to said loading station, wiring means on said rack adapted to be connected with the motor-windings of each of said motor-compressors, a vacuum vessel open at one end thereof and adapted to receive said rack, a lid for said vacuum vessel adapted to seal said open end of said vacuum vessel, said lid integrally connected to said rack, conveying means for moving said rack when loaded to said vacuum vessel and placing said loaded rack within said vacuum vessel whereby said lid engages in sealing relationship with the open end of said vacuum vessel, guide means within said vacuum vessel adapted to register with said rack and guide said rack into a proper position within said vessel, means for inducing a vacuum within said vacuum vessel, electrical means connecting said wiring means on said rack to a control circuit, said control circuit including a plurality of circuits for conducting electrical energy to the motor-windings of each of said motor-compressors contained within said vacuum vessel, current flow sensing means in said control circuit continuously testing the temperature within said motor-compressors by measuring the increase or decrease of resistance to current flow through said motor-windings, said current-flow sensing means breaking said circuits when said temperature of said motor-windings increases above a desired operating temperature, means periodically automatically closing said circuits for further heating of said motor-windings, general indicator means responsive to a break in any of the circuits during a motor-winding heating cycle and specific indicating means in each circuit responsive to a break in their respective circuits.

2. Dehydrating apparatus for motor-compressors comprising in combination a turn table forming a loading station, a rack removably supported on said turn table and adapted to receive a plurality of motor-compressors, conveying means for supplying said motor-compressors to said loading station, a vacuum vessel open at one end thereof and adapted to receive said rack and its load of motor-compressors, a lid for said vacuum vessel adapted to seal said open end of said vacuum vessel, said lid integrally connected to said rack, conveying means for moving said loaded rack to said vacuum vessel and placing said loaded rack within said vacuum vessel whereby said lid engages in sealing relationship with the open end of said vacuum vessel, means for inducing a vacuum within said vacuum vessel, radiant heating means within said vacuum vessel, circuit means for conducting electrical energy to said radiant heating means contained within said vacuum vessel, a control circuit having current flow sensing means continuously testing the temperature within at least one of said motor-compressors by measuring the increase or decrease of resistance to current flow through the motor-windings thereof, said current-flow sensing means breaking the circuits to said radiant heating means when the temperature of said motor-winding increases above the desired operating temperature, said current sensing means automatically closing the circuits to said radiant heaters for further heating when the temperature of said motor-winding drops below the desired temperature, general indicator means responsive to a break in any of the circuits during the heating cycle and specific indicating means in each circuit responsive to a break in their respective circuits.

3. A control circuit having a power source for conducting electrical energy to radiant heating means contained within a vacuum vessel for heating a plurality of motor-compressors, sensing means in said circuit connected between said motor-compressors and said power source for continuously testing the temperature of said motor-compressor units, said sensing means breaking said circuit when the temperature of said motor-compressors increases above the desired operating temperature, said sensing means automatically closing said circuit for further heating of said motor-compressors when the temperature of said motor-compressors drops below the desired operating temperature, general indicator means in said circuit responsive to a break in any part of said circuit during the heating cycle and specific indicating means in said circuit responsive to and indicating a break in specific portions of said circuit.

4. A control circuit having a power source for conducting electrical energy to a plurality of radiant heating units each of which is located adjacent a motor-compressor unit contained in a vacuum, current sensitive means in said control circuit connected with the winding of one of said motor-compressor units for continuously testing the temperature within said motor-compressor unit by measuring the increase or decrease of resistance of said motor winding, circuit making and breaking means in said circuit normally in a circuit making position operatively associated with said current sensitive means, said current sensitive means causing said circuit making and breaking means to be actuated into a circuit breaking position when the temperature in said one motor-compressor unit increases above the desired operating temperature and causing said circuit making and breaking means to be actuated into a circuit making position when said temperature drops below the desired operating temperature, general indicator means in said circuit responsive to a break in any portion of the circuit during the radiant heating cycle and specific indicating means in said circuit responsive to breaks in particular portions of the circuit during the radiant heating cycle.

5. A control circuit having a source of power for conducting electrical energy to the motor windings of a plurality of motor-compressor units, current sensitive means in said control circuit connected between said motor-compressors and said power source for continuously testing the temperature within said motor-compressor units by measuring the increase or decrease of resistance to current flow through their motor windings, circuit breaking means in said circuit operatively associated with said current sensitive means, said current sensitive means causing said circuit breaking means to be actuated into a circuit breaking position when the temperature in said motor-compressor units increases above the desired operating temperature, and means in said circuit periodically making said circuit and causing current to flow to said motor-windings, general indicator means connected in parallel with circuit and responsive to a break in any portion of the circuit during the heating cycle and specific indicating means in said circuit for each of said motor-compressors responsive to a failure of current flow to their respective motor-compressor units during the heating cycle.

6. A control circuit having a power source, a first circuit for conducting electrical energy to heating means contained within a vacuum vessel, said heating means warming a plurality of motor-compressors contained within said vacuum vessel, a second circuit having sensing means connected with at least one of said motor-compressors and said power source for continuously testing the temperature of said motor-compressor, said sensing means in said second circuit responsive to the temperature of said motor compressor, switching means in said first circuit and responsive to said sensing means for breaking said first circuit when said heating means increases the temperature of said motor compressor above the desired operating temperature, general indicator means connected in parallel with said first circuit and responsive to a break in any part of said first circuit during the heating cycle and specific switch and indicating means connected in parallel with said first circuit and responsive to a break in specific portions of said first circuit.

7. A control circuit having a power source, a first circuit for conducting electrical energy to the motor-windings of a plurality of motor-compressor units contained within a vacuum, current flow-rate sensing means in said first circuit for continuously testing the temperature within said motor-compressor units by measuring the increase or decrease of resistance to current flow through said motor-windings, a second parallel circuit, switching means in said second circuit responsive to said current flow-rate sensing means in said first circuit, said current flow rate sensing means actuating said switching means when the temperature of said motor-windings increases above a desired operating temperature to break said second circuit, means in said second circuit breaking said first circuit in response to the breaking of said second circuit specific switch and indicating means in said first circuit responsive to a break in specific portions of said circuit and means operatively associated with said means in said second circuit for breaking said first circuit for periodically and automatically closing said first circuit for further heating of said motor-windings.

8. A control circuit having a power source, a first circuit for conducting electrical energy to the motor-windings of a plurality of motor-compressor units contained within a vacuum, current flow-rate sensing means in said first circuit connected between said motor-compressors and said power source for continuously testing the temperature within said motor-compressor units by measuring the increase or decrease of resistance to current flow through said motor windings, a second parallel circuit, switching means in said second circuit responsive to said current flow-rate sensing means in said first circuit, said current flow-rate sensing means actuating said switching means when the temperature of said motor-windings increases above a desired operating temperature to break said second circuit, means in said second circuit breaking said first circuit in response to the breaking of said second circuit, general indicator means connected in parallel with said first circuit responsive to a break in any part of said first circuit during the motor-winding heating cycle, specific switch and indicating means in said first circuit for each of said motor-compressor units responsive to a failure of current flow to their respective motor-compressor units and means operatively associated with said means in said second circuit for breaking said first circuit for periodically and automatically closing said first circuit for further heating of said motor-windings.

9. Dehydrating apparatus for motor-compressors comprising a vacuum vessel open at one end thereof, a rack for insertion into said vessel, a lid connected to said rack for sealing said open end of said vessel, means on said rack individually supporting said motor-compressors, means for inducing a vacuum within said vessel, heating means for warming said motor-compressors, an electrical circuit associated with said vessel further comprising a power source for conducting electrical energy to the motor windings of at least one of said motor-compressors, contained within said vessel, sensing means in said circuit connected in series between said motor-compressor and said power source for continuously testing the temperature of said motor-compressor, switching means controlling said heating means, said switching means responsive to said sensing means for rendering said heating means inoperative when said heating means increase the temperature of said motor-compressors above the desired operating temperature, general indicator means connected in parallel with said circuit and responsive to a break in any part of said circuit during a heating cycle and specific switch and indicating means connected in parallel with said circuit and responsive to a break in specific portions of said circuit.

10. Dehydrating apparatus for motor-compressors comprising a vacuum vessel open at one end thereof, a rack for insertion into said vessel, a lid connected to said rack for sealing said open end of said vessel, means on said rack individually supporting said motor-compressors, means for inducing a vacuum within said vessel, a first circuit associated with said vessel further comprising a power source for conducting electrical energy to the motor-windings of said motor-compressors contained within said vessel, current flow-rate sensing means in said first circuit for continuously testing the temperature within said motor-compressor units by measuring the increase or decrease of resistance to current flow through the motor windings, a second parallel circuit, switching means in said second circuit responsive to said current flow-rate sensing means in said first circuit, said current flow rate sensing means actuating said switching means when the temperature of the motor-windings increases above a desired operating temperature to break said second circuit, means in said second circuit breaking said first circuit in response to the breaking of said second circuit, specific switch and indicating means in said circuit responsive to a break in specific portions of said circuit and means operatively associated with said means in said second circuit for breaking said first circuit for periodically and automatically closing said first circuit for further heating of said motor-windings.

References Cited in the file of this patent

UNITED STATES PATENTS

| | | |
|---|---|---|
| 2,156,845 | Gentele | May 2, 1939 |
| 2,282,070 | Mahannah | May 5, 1942 |
| 2,373,841 | Merrick | Apr. 17, 1945 |
| 2,436,444 | Merrick | Feb. 24, 1948 |
| 2,507,891 | David | May 16, 1950 |
| 2,903,799 | Sachaczenski | Sept. 15, 1959 |

FOREIGN PATENTS

| | | |
|---|---|---|
| 8,613 | Great Britain | 1905 |